United States Patent [19]
Kunze et al.

[11] Patent Number: 5,953,179
[45] Date of Patent: *Sep. 14, 1999

[54] LOADING MECHANISM FOR A MAGNETIC TAPE CASSETTE APPARATUS

[75] Inventors: Norbert Kunze, Diez; Stefan Koch, Bad Endbach, both of Germany

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/813,419

[22] Filed: Mar. 10, 1997

Related U.S. Application Data

[63] Continuation of application No. 08/813,419, Mar. 10, 1997.

[30] Foreign Application Priority Data

Mar. 13, 1996 [DE] Germany ............................ 196 09 790

[51] Int. Cl.⁶ .................................................. G11B 17/04
[52] U.S. Cl. ......................................... 360/96.5; 369/77.2
[58] Field of Search ................... 360/96.5, 96.6; 242/338.4; 369/77.2

[56] References Cited

U.S. PATENT DOCUMENTS

| | | | |
|---|---|---|---|
| 4,424,540 | 1/1984 | Naoi | 360/96.5 |
| 4,825,312 | 4/1989 | Yoshikawa et al. | 360/96.5 |
| 5,060,094 | 10/1991 | Chung et al. | 360/96.5 |
| 5,214,548 | 5/1993 | Nakanishi | 360/96.5 |

FOREIGN PATENT DOCUMENTS

3241361C2  5/1983  Germany .

*Primary Examiner*—David D. Davis
*Attorney, Agent, or Firm*—Steven S. Rubin

[57] ABSTRACT

The invention relates to a loading mechanism in a tape deck of a magnetic-tape-cassette apparatus, for moving a magnetic-tape cassette from an eject position of the loading mechanism into a play position of the loading mechanism. The mechanism comprises a cassette holder for holding the magnetic-tape cassette and a first lift plate, by means of which the cassette holder is movable between an intermediate position of the loading mechanism and the play position of the loading mechanism substantially in a vertical loading direction. The first lift plate and the cassette holder are movable from the eject position into the intermediate position in a horizontal loading direction, and a lift element is arranged on a frame so as to be rotatable and so as to be movable in the horizontal loading direction. The cassette holder, the lift element and the first lift plate are movable from the intermediate position into the eject position and vice versa in the horizontal loading direction. When the first lift plate is moved in the horizontal loading direction it exerts a force on the cassette holder and the lift element in such a manner that the cassette holder is moved substantially in the vertical loading direction, during which movement the lift element performs a rotary movement.

20 Claims, 10 Drawing Sheets

LOADING MECHANISM FOR A MAGNETIC TAPE CASSETTE APPARATUS

CROSS REFERENCE TO RELATED APPLICATIONS

This is a continuation of application Ser. No. 08/813,419 filed Mar. 10, 1997.

BACKGROUND OF THE INVENTION

1. Field of the Invention

The invention relates to a loading mechanism in a tape deck of a magnetic-tape-cassette apparatus, for moving a magnetic-tape cassette from an eject position of the loading mechanism into a play position of the loading mechanism, comprising a cassette holder for holding the magnetic-tape cassette and a first lift plate, by means of which the cassette holder is movable between an intermediate position of the loading mechanism and the play position of the loading mechanism substantially in a vertical loading direction, the first lift plate and the cassette holder being movable from the eject position into the intermediate position in a horizontal loading direction.

2. Description of the Related Art

Such a loading mechanism is known from German Publication DE 32 41 361 C2. This known loading mechanism comprises a cassette holder having at least two pins arranged on each side. These pins engage both in guide slots in a frame and in guide slots in at least two movable lift plates. Both lift plates are coupled to one another so as to be translationally movable in the same direction. To bring the cassette holder from the intermediate position into the play position both lift plates are moved in the horizontal loading direction by means of a drive mechanism and then exert a force in the vertical loading direction on the pins arranged on the cassette holder. In such a loading mechanism the entire force required in the vertical loading direction in order to move the magnetic-tape cassette from the play position into the intermediate position should be applied by means of the two lift plates. When the two lift plates are driven by means of teethed wheels and toothed racks made of a plastic, the force which can be transmitted by such a drive mechanism is limited by the strength of the plastic. Particularly in the case of heavy magnetic-tape cassettes this may give rise to problems. In addition, each of the two lift plates should have a toothed rack, which meshes with a respective toothed wheel. The two toothed wheels should be coupled translationally by means of a common spindle. As a result of this, a large number of parts is required. The spindle which provides the translational coupling between the two toothed wheels imposes restrictions on the mounting space required for the loading mechanism.

SUMMARY OF THE INVENTION

It is an object of the invention to provide a loading mechanism of the type defined in the opening paragraph, which is simple and reliable and in which the forces necessary to move the magnetic-tape cassette from the play position into the intermediate position are minimal.

According to the invention this object is achieved in that there is provided a lift element, which is arranged on a frame so as to be rotatable and so as to be movable in the horizontal loading direction, which frame is mounted on a deck plate, the lift element is rotatably coupled to the cassette holder in at least one coupling point, the cassette holder, the lift element and the first lift plate are movable from the intermediate position into the eject position and vice versa in the horizontal loading direction, during the movement of the loading mechanism from the intermediate position into the play position and from the play position into the intermediate position the first lift plate is moved in the horizontal loading direction and exerts a force on the cassette holder and the lift element in such a manner that the cassette holder is moved from the intermediate position into the play position and from the play position into the intermediate position substantially in the vertical loading direction, during which movement the lift element performs a rotary movement.

In the play position of the loading mechanism, for example, the reel-discs of the magnetic-tape-cassette apparatus engage the reel-disc openings of the magnetic-tape cassette and the magnetic tape can be moved past a magnetic head. When the magnetic-tape cassette is to be moved from this play position into an eject position, in which a user can remove the magnetic-tape cassette by hand, the magnetic-tape cassette is first lifted from the play position into the intermediate position in the vertical loading direction. The lifting force required for lifting the magnetic-tape cassette is applied by the first lift plate, which moves in the horizontal loading direction, exerting a force both on the cassette holder and on the lift element. The force exerted on the lift element is transmitted to the cassette holder in the coupling point between the lift element and the cassette holder. When the loading mechanism is moved from the play position into the intermediate position the lift element, which is pivotably mounted on the frame, is pivoted, abutting against the frame in the vertical loading direction, and can thus partly take up the force of gravity of the magnetic-tape cassette in the vertical loading direction. As a result of this, the force to be exerted by the first lift plate to move the loading mechanism from the play position into the intermediate position can be reduced. It is possible that the lift element also performs a slight movement in the horizontal loading direction during this pivotal movement.

As only one lift plate is needed, parts are saved and the intricate translational coupling of the two lift plates by means of a common spindle can be dispensed with. Since only one lift plate is required, mounting space is saved at one side of the cassette holder, particularly at the side of the cassette holder where the magnetic head of the magnetic-tape-cassette apparatus enters the magnetic-tape cassette.

An advantageous embodiment of the invention is characterized in that the lift element comprises a first and a second pin, which are respectively guided in a first and a second guide slot of the frame, which slots extend in the horizontal loading direction.

The first horizontal guide slot is situated at one side of the frame, opposite the second guide slot at the other side of the frame. By means of such a construction it is simple to realize a pivotable coupling of the lift element to the cassette holder, which also allows a horizontal movement of the lift element relative to the cassette holder.

A further advantageous embodiment of the invention is characterized in that the lift element comprises a third pin, which is guided in a third guide slot of the frame, the third guide slot being substantially L-shaped and comprising a horizontal portion, which extends in the horizontal loading direction, and a vertical portion, which extends substantially in the vertical loading direction, the vertical portion having a curved shape.

When the loading mechanism is moved from the eject position into the intermediate position, the third pin of the lift element is guided in the horizontal portion of the third guide slot of the frame. When the loading mechanism is moved from the intermediate position into the play position, the third pin of the lift element is guided in the vertical portion of the third guide slot of the frame, which portion of the third guide slot extends substantially in the vertical loading direction. Since the lift element is pivoted about the pivotal axis during this movement of the loading mechanism from the intermediate position into the play position, the vertical portion of the third guide slot is curved so that the third pin of the lift element can also perform a pivotal movement.

A further advantageous embodiment of the invention is characterized in that the cassette holder comprises a first pin, which is guided a fourth guide slot in the frame, the fourth guide slot being substantially L-shaped and comprising a horizontal portion, which extends in the horizontal loading direction, and a vertical portion, which extends in the vertical loading direction.

When the cassette holder is moved from the eject position into the intermediate position, the first pin of the cassette holder is guided in the horizontal portion of the fourth guide slot of the frame. When the cassette holder is moved from the intermediate position into the play position, the first pin of the cassette holder is guided in the vertical portion of the fourth guide slot of the frame. This ensures that the cassette holder and, consequently, the magnetic-tape cassette are lowered from the intermediate position into the play position in the vertical loading direction and, as a result, the reel-disc openings of the magnetic-tape cassette are lowered onto the reel discs of the magnetic-tape-cassette apparatus in the vertical loading direction.

A further advantageous embodiment of the invention is characterized in that the first lift plate has a first and a second inclined slot, the first pin of the cassette holder engaging the first slot and the third pin of the lift element engaging the second slot.

When the first lift plate is moved from the eject position into the intermediate position, the edge portions of the first and the second slot of the first lift plate respectively exert a force in the horizontal loading direction on the first pin of the cassette holder and on the third pin of the lift element, as a result of which the lift element and the cassette holder are moved from the eject position into the intermediate position in the horizontal loading direction. The simultaneous guidance of the first pin of the cassette holder in the horizontal portion of the fourth guide slot of the frame and of the third pin of the lift element on the horizontal portion of the third guide slot of the frame prevent the first pin of the cassette holder and the third pin of the lift element from, respectively, sliding down the first and the second slot of the first lift plate. When the lift plate is moved from the intermediate position into the play position in the horizontal loading direction, the edge portions of the first and the second slot of the first lift plate respectively exert a force in the vertical loading direction on the first pin of the cassette holder and on the third pin of the lift element, as a result of which the lift element and the cassette holder are moved from the intermediate position into the play position. The first pin of the cassette holder and the third pin of the lift element then slide down the inclined slots in the first lift plate. At the same time the first pin of the cassette holder is guided in the vertical portion of the fourth guide slot of the frame and third pin of the lift element is guided in the curved vertical portion of the third guide slot.

A further advantageous embodiment of the invention is characterized in that the frame has a contact surface which extends in the horizontal loading direction and on which a projection of the cassette holder can be guided.

Such a horizontal contact surface provides a better guidance of the cassette holder during its movement between the eject position and the intermediate position.

A further advantageous embodiment of the invention is characterized in that the second slot of the first lift plate is curve-shaped, the angle between the tangent line to this curved second slot and the vertical loading direction increasing in a direction towards the upper surface of the first lift plate.

The force to be applied by the first lift plate when the magnetic-tape cassette is lifted from the play position into the intermediate position increases continuously towards the intermediate position. This is due to the pivotable mounting of the lift element on the frame. The part of the total force of gravity of the cassette which can be transmitted by the lift element while supported on the frame increases as the angle between the horizontal loading direction and the lift element increases. This effect is counteracted by the curved shape of the second slot. The force component exerted on the third pin of the lift element in a vertical direction by the horizontal movement of the first lift plate increases as the angle between the tangent line to the curved second slot and the vertical loading direction increases. Thus, it is achieved that the force to be applied for driving the first lift plate in the horizontal direction is constant during the movement between the intermediate position and the play position.

A further advantageous embodiment of the invention is characterized in that the first slot of the first lift plate is curve-shaped, the angle between the tangent line to this curved first slot and the vertical loading direction increasing in a direction towards the upper surface of the first lift plate.

If the second slot of the first lift plate is curved and the first slot is straight, this may give rise to a slight tilting of the magnetic-tape cassette relative to the horizontal loading direction while the magnetic-tape cassette is moved from the play position into the intermediate position. In order to preclude this, the first slot of the first lift plate is also given a curved shape. The first slot of the first lift plate, in which the first pin of the cassette holder is guided, is generally situated nearer the pivot of the lift element. In order to ensure that the magnetic-tape cassette remains exactly horizontal during lifting and lowering, the curvature of the curved first slot and the curvature of the curved second slot should be adapted to one another.

A further advantageous embodiment of the invention is characterized in that the lift element and the first lift plate are restrained relative to one another by means of a spring.

When the magnetic-tape-cassette apparatus is in its off-state, it is undesirable that the magnetic-tape cassette can be inserted into the apparatus beyond the eject position, in order to preclude damage to the magnetic-tape-cassette apparatus. When a magnetic-tape cassette is situated in the cassette holder in the off-state of the magnetic-tape-cassette apparatus and the cassette, and hence the cassette holder and the lift element, is pushed by hand into the apparatus beyond the eject position, the spring between the lift element and the first lift plate is tensioned and moves the lift element, the cassette holder and the magnetic-tape cassette back into the eject position once the user releases the cassette.

A further advantageous embodiment of the invention is characterized in that the lift element is rotatably coupled to the cassette holder in at least two coupling points.

Two coupling points guarantee a higher stability of the pivotable coupling between the lift element and the cassette holder.

A further advantageous embodiment of the invention is characterized in that the lift element comprises a fourth pin, which is guided in a fifth guide slot of the frame, the fifth guide slot being substantially L-shaped and comprising a horizontal portion, which extends in the horizontal loading direction, and a vertical portion, which extends substantially in the vertical loading direction, the vertical portion having a curved shape, and the cassette holder comprising a second pin, which is guided a sixth guide slot in the frame, the sixth guide slot being substantially L-shaped and comprising a horizontal portion, which extends in the horizontal loading direction, and a vertical portion, which extends in the vertical loading direction.

Such a loading mechanism has a higher stability and enables an even better guidance of the lift element and the cassette holder to be achieved. This is particularly advantageous if the loading mechanism is used not for a magnetic-tape-cassette apparatus but for a Compact Disc or CD-ROM or another data carrier having a larger width than a magnetic-tape cassette.

The loading mechanism is preferably used in a tape deck, in a magnetic-tape-cassette apparatus including a tape deck, in a digital magnetic-tape-cassette apparatus including a tape deck, or in an apparatus for reading information which has been stored digitally on discs or other information carriers.

BRIEF DESCRIPTION OF THE DRAWINGS

An embodiment of the invention will be described in more detail with reference to FIGS. 1 to 10 of the drawings. In the drawings.

DESCRIPTION OF THE PREFERRED EMBODIMENTS

Figure 1:
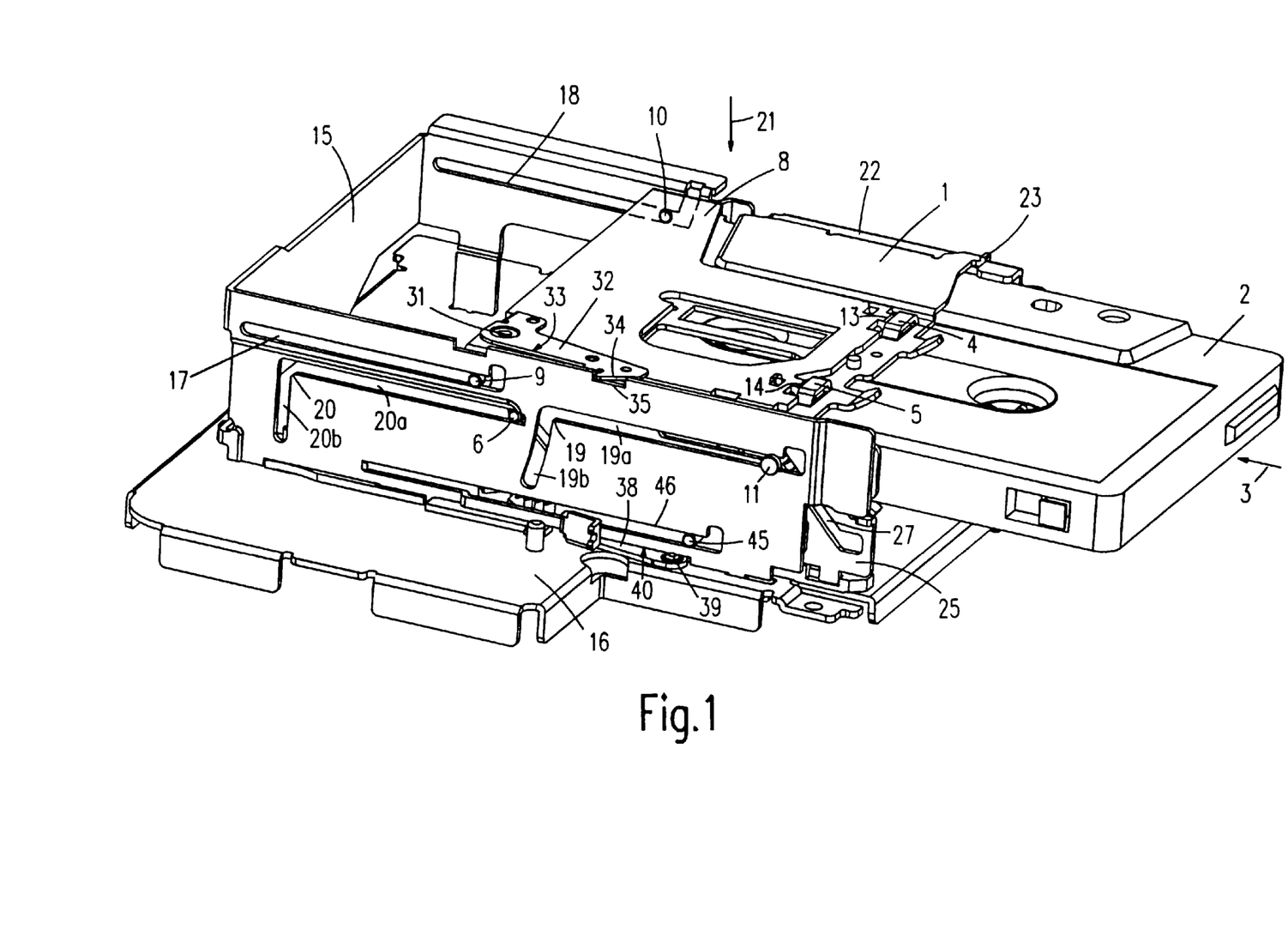
FIG. 1 is a perspective view showing a loading mechanism in an eject position, in which a user can remove the cassette by hand, which mechanism comprises a frame, a lift plate, which is concealed for the greater part by the frame, a cassette holder, and a lift element.
Figure 2:
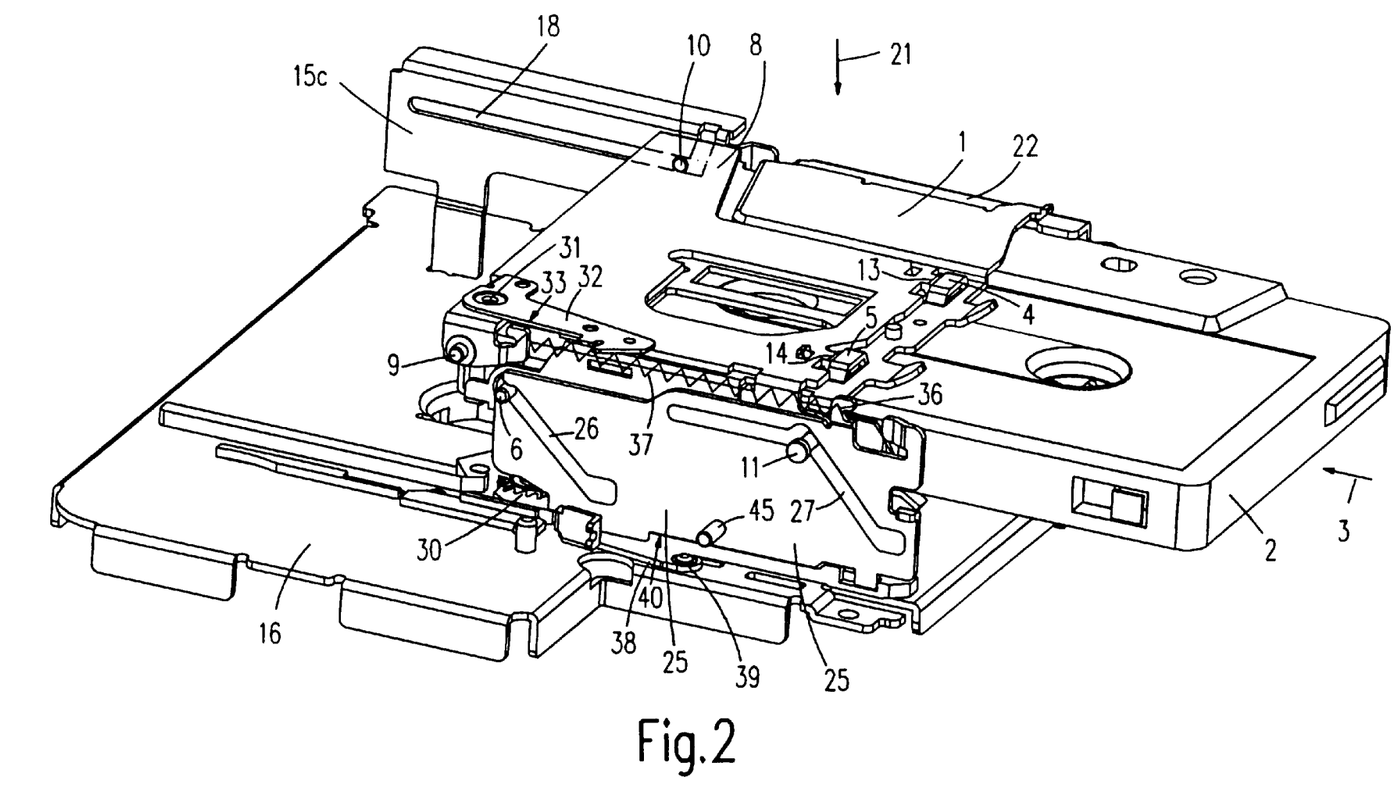
FIG. 2 shows the loading mechanism in the eject position of FIG. 1, a side wall and the rear wall of the frame not being shown in order to elucidate the construction and operation of the first lift plate.
Figure 10:
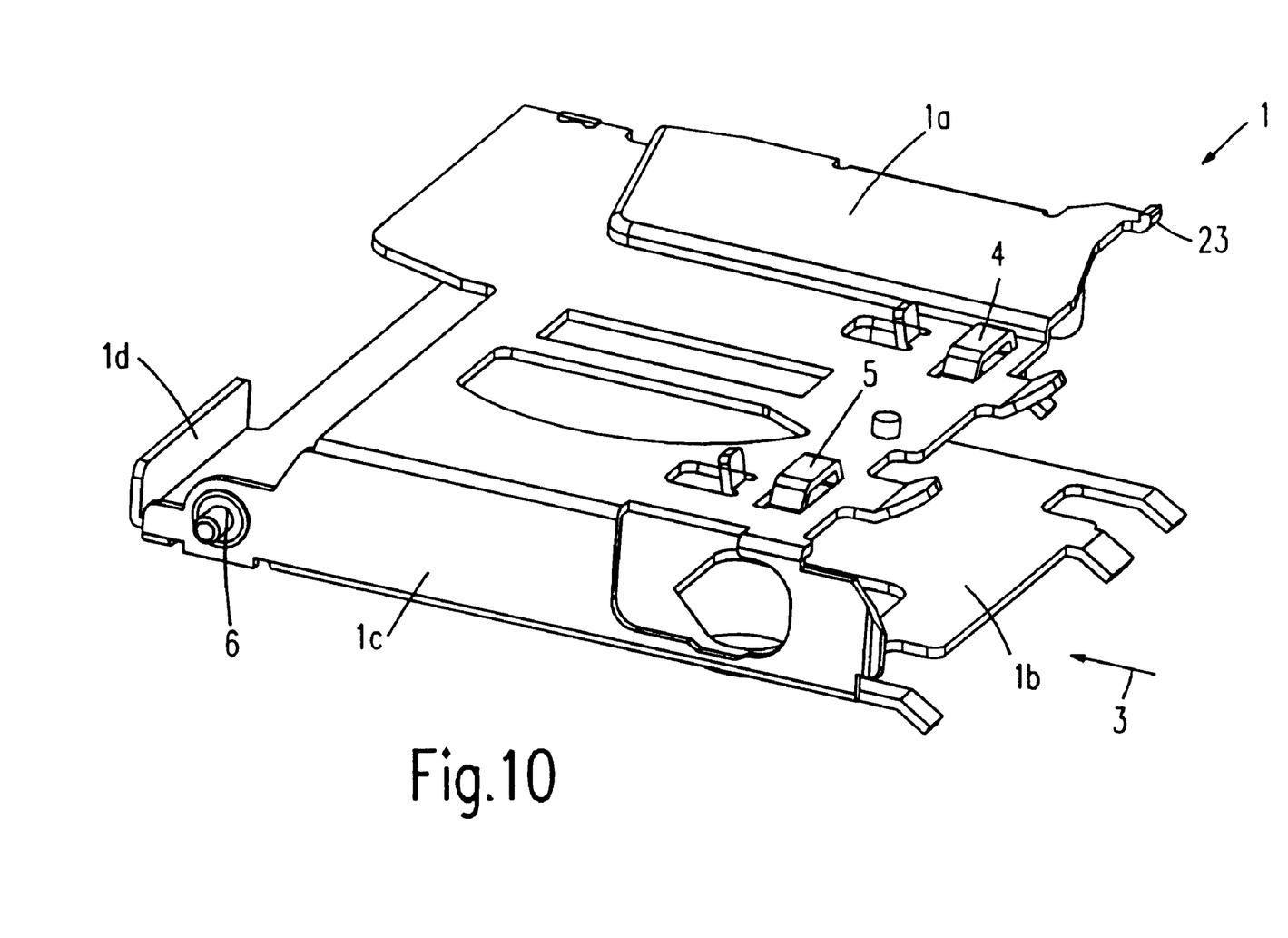
FIG. 10 is a perspective view of the cassette holder.

FIGS. 1 and 2 are perspective views showing a loading mechanism of a deck of magnetic-tape-cassette apparatus in an eject position, in which a user can remove the magnetic-tape cassette 2 by hand. The loading mechanism comprises a cassette holder 1, into which the magnetic-tape cassette 2 has been inserted in a horizontal loading direction 3. The cassette holder 1 is shown separately in perspective view in FIG. 10. It comprises, spaced from one another, an upper plate 1a, a lower plate 1b, a side wall 1c, which extends in the horizontal loading direction 3, and a rear abutment wall 1d, against which the magnetic-tape cassette 2 can be slid when inserted by hand. The cassette holder 1 has two U-shaped hinge openings 4 and 5 in the upper plate 1a and a first pin 6 on the side wall 1c.

Figure 7:
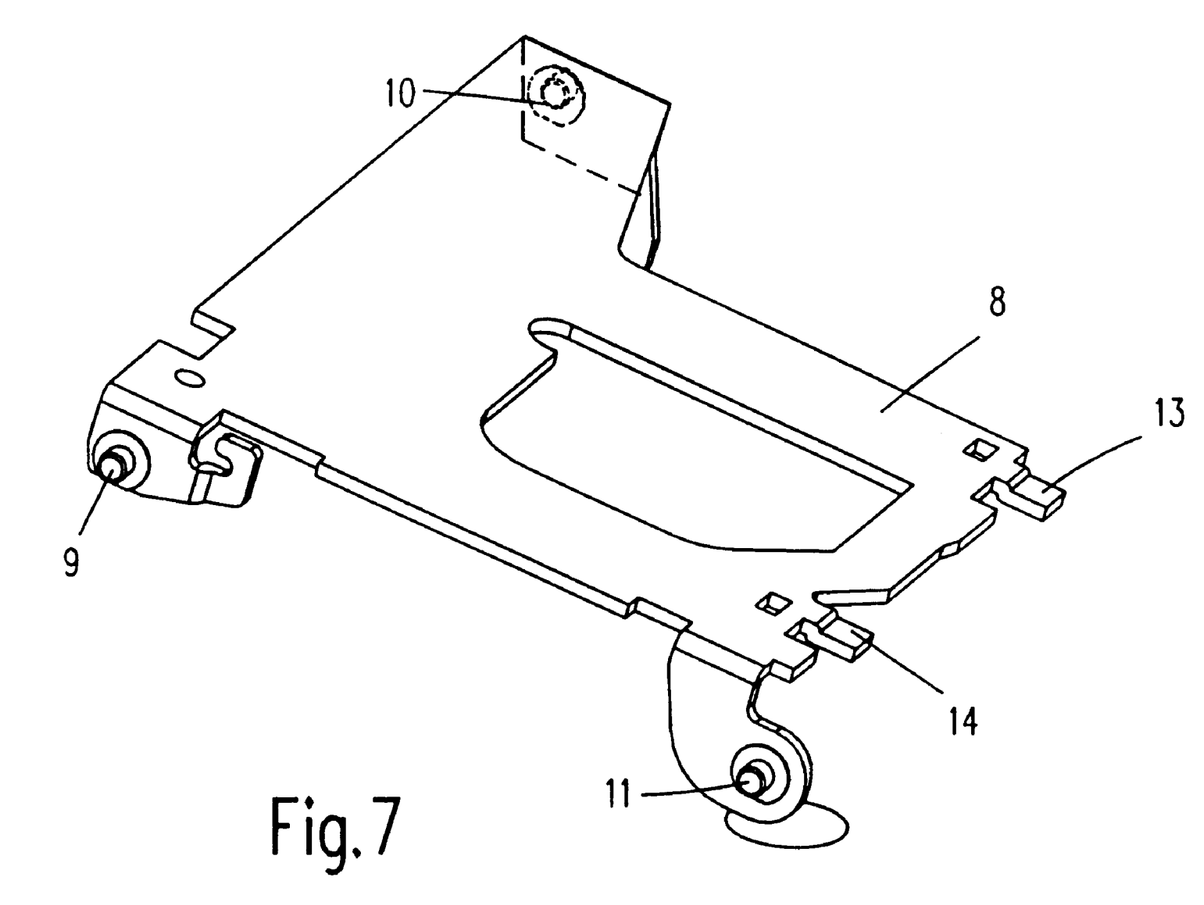
FIG. 7 is a perspective view of the lift element.

A lift element 8 has been provided, which is shown separately in perspective view in FIG. 7. This lift element 8 comprises a first pin 9, a second pin 10 at the opposite side, a third pin 11 and two lift projections 13 and 14. These lift projections 13 and 14 engage the hinge openings 4 and 5 of the cassette holder 1.

Figure 9:
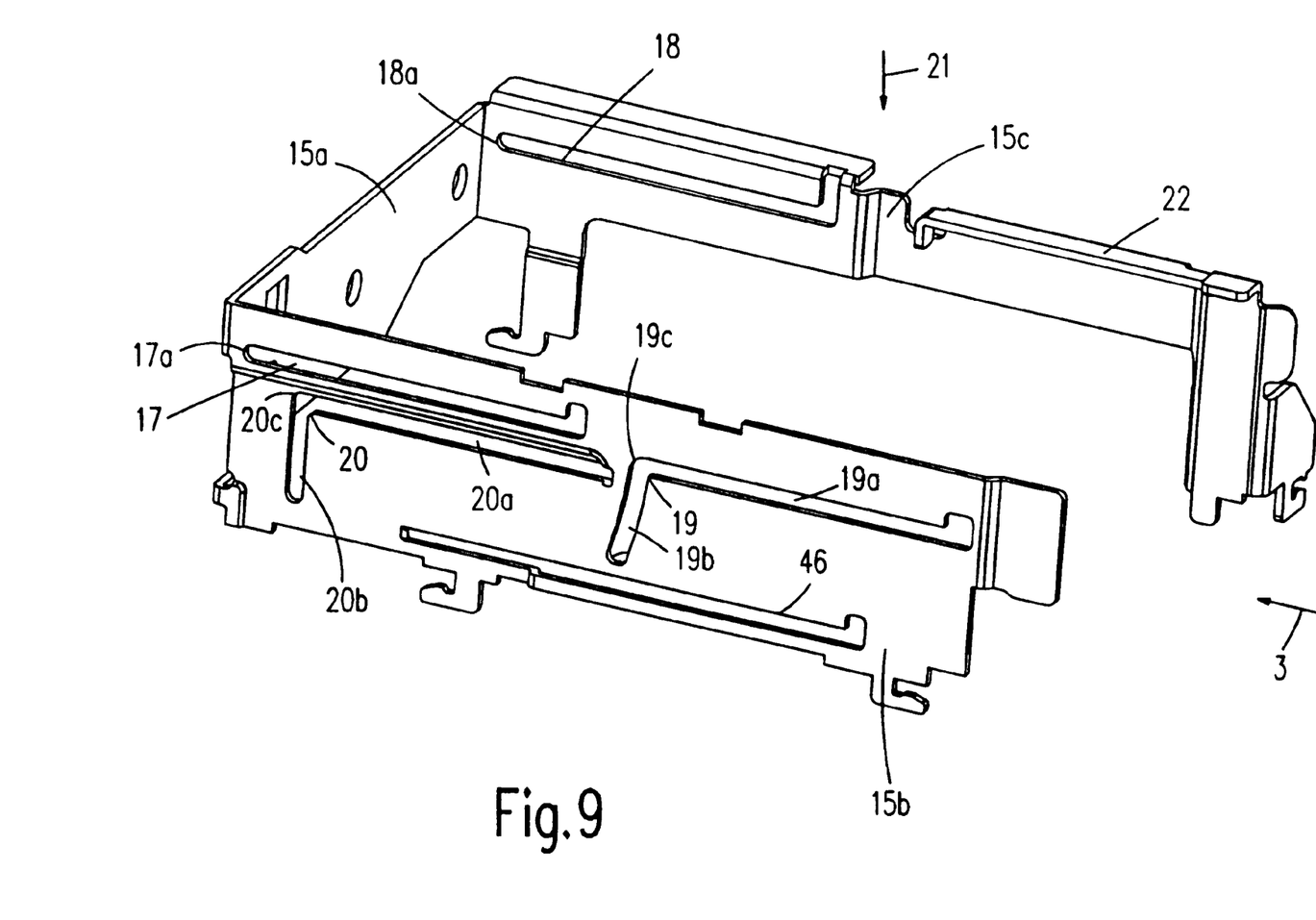
FIG. 9 is a perspective view of the frame.

A U-shaped frame 15 has been provided, which is shown separately in FIG. 9 and which comprises a rear wall 15a and two side walls 15b and 15c. The side wall 15b of the frame 15 has a first guide slot 17, which extends in the horizontal loading direction 3, and the side wall 15c has a second guide slot 18, which extends in the horizontal loading direction 3. The side wall 15b of the frame 15 has a third guide slot 19, which is substantially L-shaped and which comprises a horizontal portion 19a, which extends in the horizontal loading direction 3, and a vertical portion 19b, which extends substantially in a vertical loading direction 21, the vertical portion 19b having a curved shape. The side wall 15b of the frame 15 has a fourth guide slot 20, which is substantially L-shaped and which comprises a horizontal portion 20a, which extends in the horizontal loading direction 3, and a vertical portion 20b, which extends in the vertical loading direction 21.

As is apparent from FIGS. 1 and 2, the frame 15 is mounted on a deck plate 16 of a magnetic-tape-cassette apparatus. The first pin 9 of the lift element 8 engages the first guide slot 17 of the frame 15, the second pin 10 of the lift element 8 engages the second guide slot 18 of the frame 15, and the third pin 11 of the lift element 8 engages the third guide slot 19 of the frame 15. The first pin 6 of the cassette holder 1 engages the fourth guide slot 20 of the frame 15. The side wall 15c of the frame 15 has a contact surface 22 along which a projection 23 of the cassette holder 1 can slide in the horizontal loading direction 3.

Figure 8:
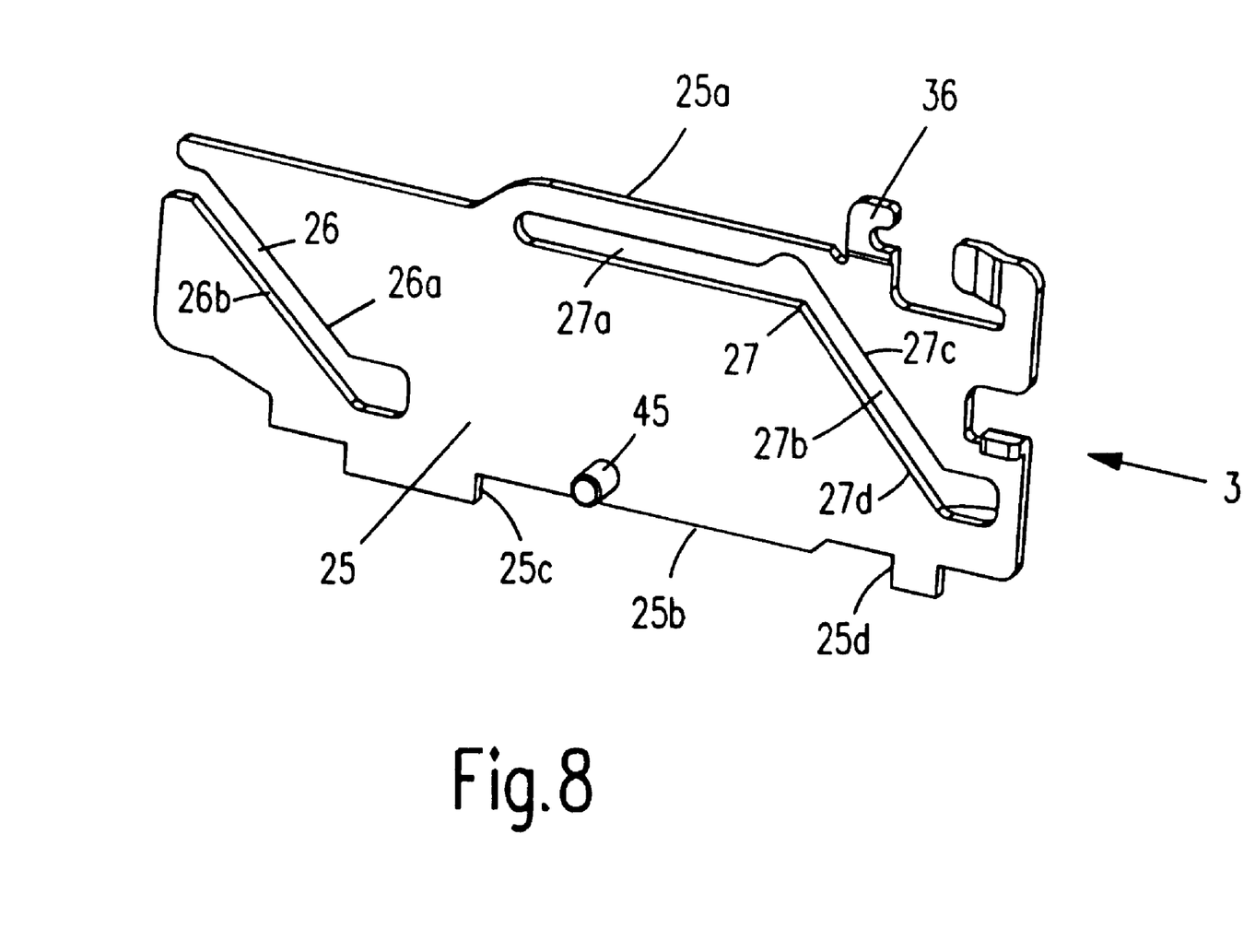
FIG. 8 is a perspective view of the first lift plate.

A first lift plate 25 has been provided, which is shown separately in FIG. 8 and which has a first slot 26, which is inclined relative to the horizontal loading direction 3, and a second slot 27. The second slot 27 of the first lift plate 25 comprises a horizontal portion 27a, which extends in the horizontal loading direction 3, and a portion 27b, which is inclined relative to the horizontal loading direction 3.

As is apparent from FIG. 2, the first pin 6 of the cassette holder 1 engages the slot 26 of the first lift plate 25 and the third pin 11 of the lift element 8 engages the second slot 27. As can be seen in FIG. 1, the first lift plate 25 comprises a guide pin 45, which is guided in a sixth guide slot 46 of the frame 15, which slot extends in the horizontal loading direction 3. The first lift plate 25 has an upper surface 25a and a lower surface 25b. The lower surface 25b of the lift plate 25 is supported on the deck plate 16 so as to be slidable in the horizontal loading direction 3. The first lift plate 25 can be moved back and forth in the horizontal loading direction 3 by a toothed rack 30, which is movably supported on the deck plate 16 and which can be driven in the horizontal loading direction 3 by a servo motor, not shown. When the first lift plate 25 is moved in the horizontal loading direction 3 by the toothed rack 30, the toothed rack 30 abuts against an edge 25c of the first lift plate 25, and when the first lift plate 25 is moved in a direction opposite to the horizontal loading direction 3 by the toothed rack 30, the toothed rack 30 abuts against an edge 25d of the first lift plate 25.

A latching lever 32 is mounted on the lift element 8 so as to be pivotable about a pivot 31 and is spring-loaded in a direction indicated by an arrow 33. This latching lever 32 latches the lift element 8 and the cassette holder 1 to the frame 15 as long as the magnetic-tape cassette 2 does not act upon the latching lever 32. For this purpose, a projection 34 of the latching lever 32 engages a latching recess 35 in the frame 15 under the influence of the spring load. If a user now pushes the magnetic-tape cassette 2 against the rear abutment wall 1d of the cassette holder 1, the magnetic-tape cassette 2 acts upon the latching lever 32 in such a manner that this lever is pivoted in a direction opposite to that indicated by the arrow 33 and thereby unlatches the cassette holder 1 and the lift element 8 from the frame 15. Thus, it is achieved that the loading mechanism cannot be actuated until a user has wholly inserted the magnetic-tape cassette 2 into the cassette holder 1 by hand.

The first lift plate 25 has a lift plate hook 36, which is restrained relative to the first pin 9 of the lift element 8 by means of a diagrammatically shown lift spring 37. A blocking lever 38, which is spring-loaded in a direction indicated by an arrow 40, is mounted on the deck plate 16 so as to be pivotable about a pivot 39.

In FIG. 1 the loading mechanism is shown in the eject position with the complete frame 15 and in FIG. 2 the rear wall 15a and the side wall 15b of the frame 15 are not shown to clarify the operation of the first lift plate 25. In the eject position shown in FIGS. 1 and 2 the magnetic-tape cassette 2 has been inserted so far into the cassette holder 1 that it abuts against the rear abutment wall 1d of the cassette holder 1 and, as a result of this, the cassette holder 1 and the lift element 8 are no longer latched to the frame 15 by the latching lever 32. When the user attempts to insert the magnetic-tape cassette 2 beyond this eject position in the horizontal loading direction, two operating conditions can be distinguished:

If the magnetic-tape-cassette apparatus is in its switched-off state, it is undesirable, in order to preclude damage to the apparatus, that a user can insert the magnetic-tape cassette 2 by hand into the magnetic-tape-cassette apparatus beyond the eject position. This is guaranteed by means of the blocking lever 38. When in the off-state of the magnetic-tape-cassette apparatus the magnetic-tape cassette 2 is inserted into the magnetic-tape-cassette apparatus in the horizontal loading direction 3 beyond the eject position, the first lift plate 25 is blocked in the horizontal loading direction 3 by the blocking lever 38 in a manner, not shown. When the user now inserts the magnetic-tape cassette 2 further in the horizontal loading direction 3, the cassette holder 1 and the lift element 8 are also moved in the horizontal loading direction 3. As a result of this, the lift spring 37 is tensioned between the non-moving first lift plate 25 and the lift element 8, which moves in the horizontal loading direction 3. Consequently, the cassette holder 1, the lift element 8 and the magnetic-tape cassette 2 are subjected to a force opposed to the horizontal loading direction 3 and, owing to the spring force exerted by the lift spring 37, they are moved back to the eject position each time that the user no longer exerts any force on the magnetic-tape cassette 2.

When in the switched-on state of the magnetic-tape-cassette apparatus the magnetic-tape cassette 2 is inserted into the magnetic-tape-cassette apparatus in the horizontal loading direction 3 beyond the eject position, a switch, not shown, is actuated after a given travel, which can be for example of the order of magnitude of about 4 mm. As a result of the actuation of this switch, not shown, a servo motor, not shown, is started and drives the toothed rack 30 via a drive chain, not shown, to move this toothed rack in the horizontal loading direction 3. The toothed rack 30, which moves in the horizontal loading direction 3, acts upon the blocking lever 38 in such a manner that this lever is pivoted in a direction opposite to that indicated by the arrow 40 and allows the first lift plate 25 to move in the horizontal loading direction 3.

Figure 3:
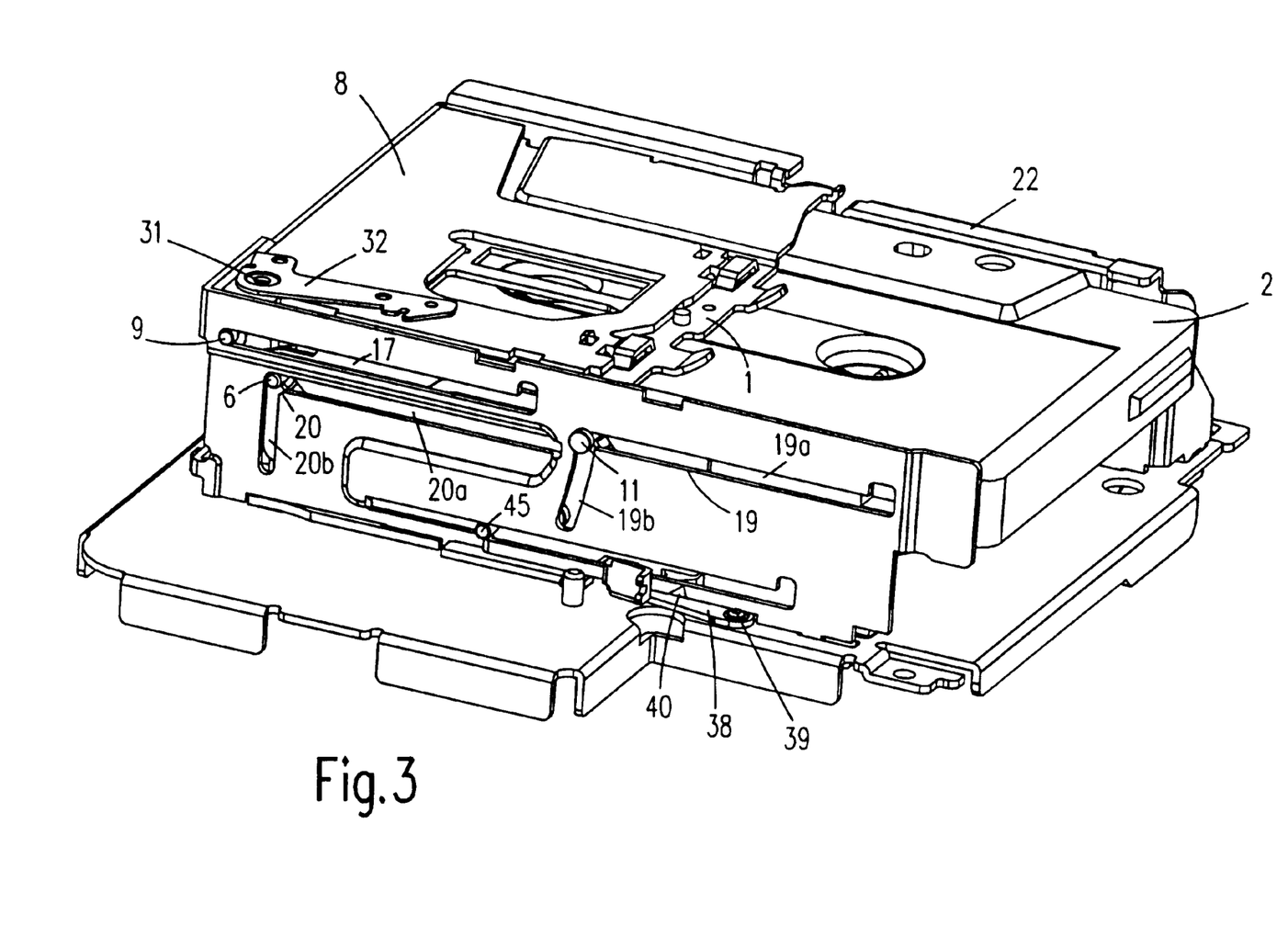
FIG. 3 is a perspective view of the loading mechanism of FIG. 1 in an intermediate position, in which the lift element, the cassette holder and the first lift plate have been moved in a horizontal loading direction with respect to the eject position.

Subsequently, the loading mechanism is moved into an intermediate position, which is shown in perspective view in FIGS. 3 and 4. In FIG. 3 the loading mechanism is shown in the intermediate position with the complete frame 15 and in FIG. 4 the rear wall 15a and the side wall 15b of the frame 15 are not shown to clarify the operation of the first lift plate 25.

During the movement from the eject position into the intermediate position the toothed rack 30 moves in the horizontal loading direction 3 and abuts against the edge 25c of the first lift plate 25, as a result of which it moves this lift plate 25 from the eject position into the intermediate position. The first lift plate 25, which has been moved in the horizontal loading direction 3 by the toothed rack 30, then presses with the edge 26a of the first slot 26 against the first pin 6 of the cassette holder 1 in the horizontal loading direction 3 and presses with the edge 27c of the second slot against the third pin 11 of the lift element 8. The first pin 6 of the cassette holder 1 then cannot slide down the inclined first slot 26 of the first lift plate 25 because it is guided by the horizontal portion 20a of the fourth guide slot 20 of the frame 15. The third pin 11 of the lift element 8 cannot slide down the inclined portion of the second slot 27 of the first lift plate 25 because it is at the same time guided by the horizontal portion 19a of the third guide slot 19 of the frame 15. During the movement from the eject position into the intermediate position the first pin 9 of the lift element 8 slides in the first guide slot 17 of the frame 15, which guide slot extends in the horizontal loading direction 3, and the second pin 10 of the lift element 8 moves in the second guide slot 18 of the frame 15. Moreover, during the movement from the eject position into the intermediate position the projection 23 of the cassette holder 1 engages with the contact surface 22 of the frame 15.

Figure 4:
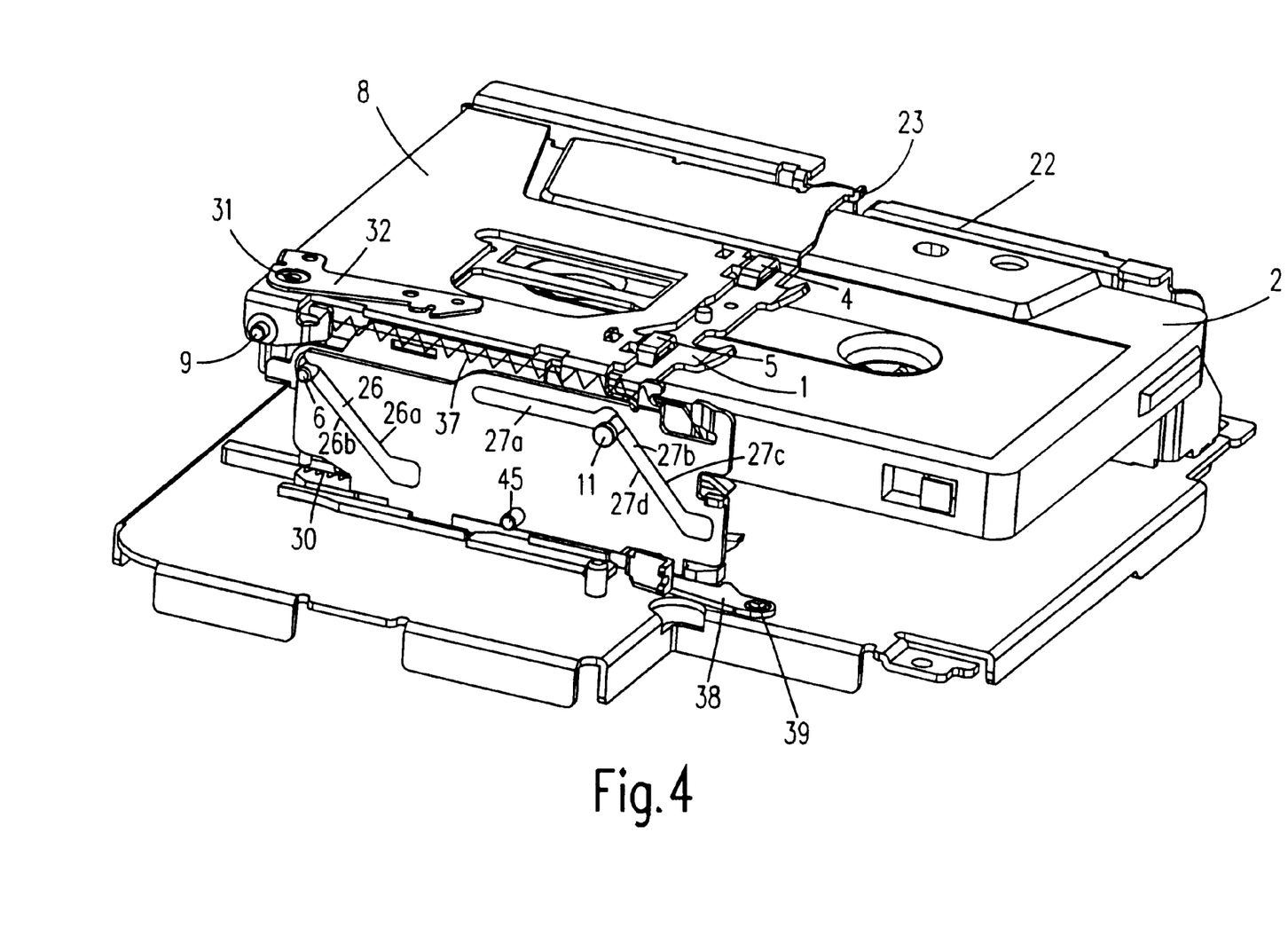
FIG. 4 shows the loading mechanism in the intermediate position of FIG. 3, a side wall and the rear wall of the frame not being shown in order to elucidate the construction and operation of the first lift plate.

Thus, the toothed rack 30, the first lift plate 25, the lift element 8 and the cassette holder 1 with the magnetic-tape cassette 2 are moved in the horizontal loading direction from the eject position into the intermediate position which is shown in perspective view in FIGS. 3 and 4. In the intermediate position the movement of the lift element 8 and the cassette holder 1 in the horizontal loading direction 3 is stopped in that the first pin 6 of the cassette holder 1 exerts pressure upon the frame 15 in the portion 20c of the fourth guide slot 20. Moreover, the first pin 9 and the second pin 10 of the lift element 8 press against the end walls 17a and 18a of the first guide slot 17 and the second guide slot 18, respectively.

Figure 5:
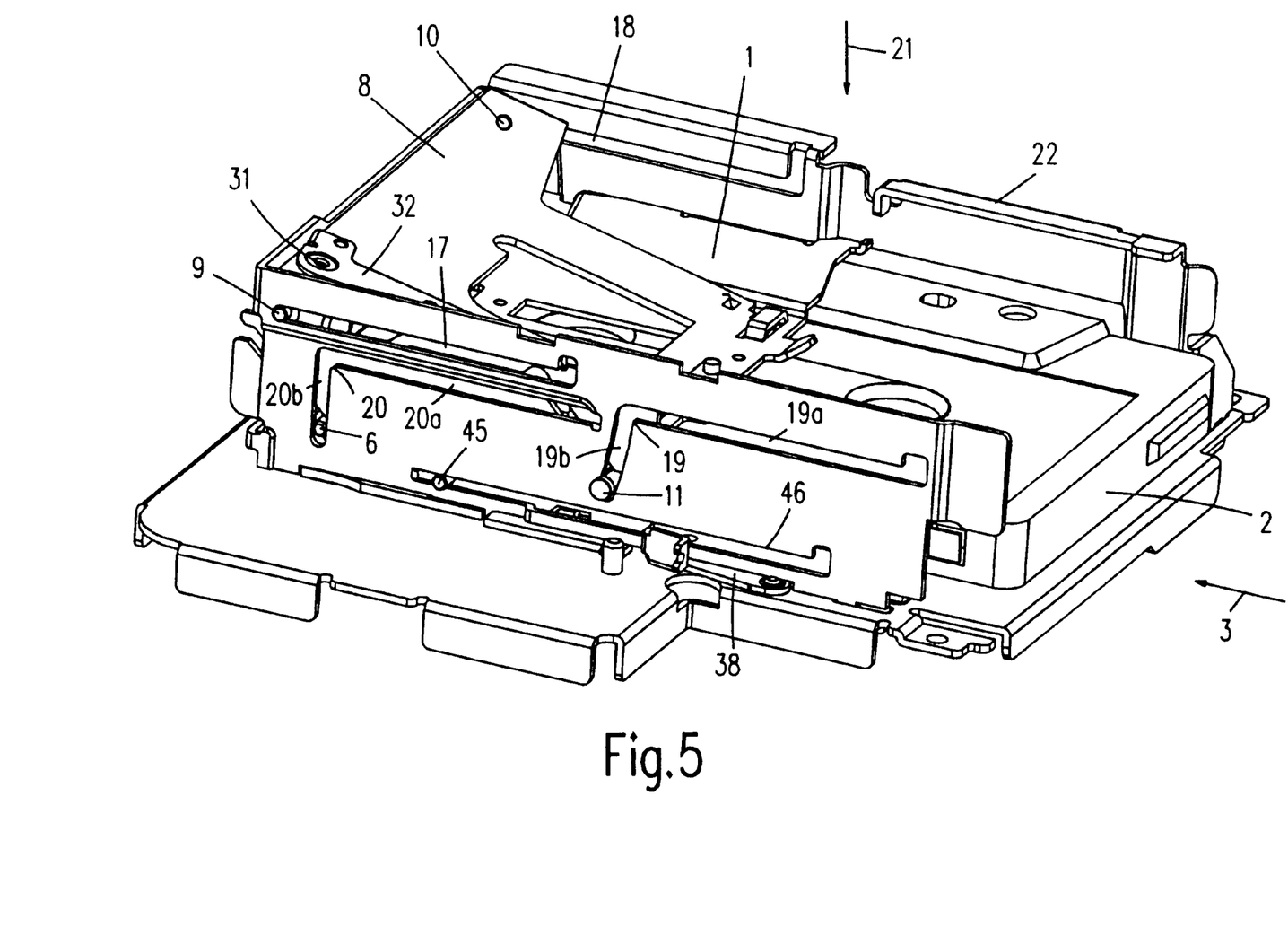
FIG. 5 shows the loading mechanism of FIG. 1 in a play position, in which the first lift plate has been moved in the horizontal loading direction with respect to the intermediate position, the lift element has been pivoted about a pivotal axis, and the cassette holder with the magnetic-tape cassette has been lowered in a vertical loading direction onto reel discs, not shown, of the magnetic-tape-cassette apparatus.
Figure 6:
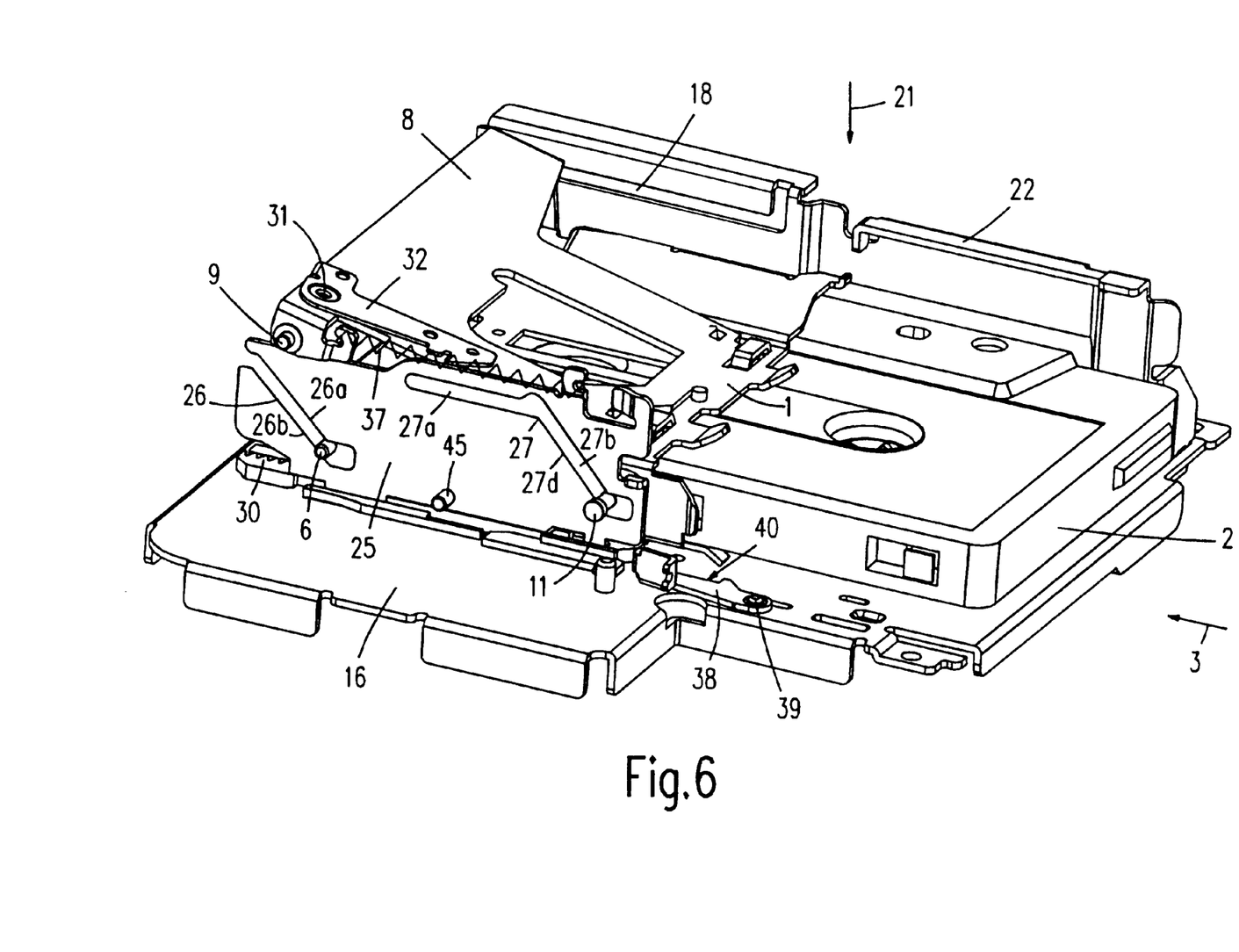
FIG. 6 shows the loading mechanism of FIG. 5 in the play position, a side wall and the rear wall of the frame not being shown in order to elucidate the construction and operation of the first lift plate.

Subsequently, the loading mechanism is moved from the intermediate position into a play position, which is shown in perspective view in FIGS. 5 and 6. In FIG. 5 the entire frame 15 is shown and in FIG. 6 the side wall 15b and the rear wall 15a of the frame 15 are not shown in order to clarify the operation of the first lift plate 25.

In order to move the loading mechanism from the intermediate position into the play position the toothed rack 30 and hence the first lift plate 25 are moved further in the horizontal loading direction 3, driven by means of the drive chain, not shown, and the servo motor, not shown. The edge 26a of the first slot 26 of then first lift plate 25 exerts a force on the first pin 6 of the cassette holder 1 in the vertical loading direction 21, as a result of which the first pin 6 of the cassette holder 1 slides down the first slot 26 of the first lift plate 25 in the vertical loading direction 21, the first pin 6 of the cassette holder 1 being guided at the same time in the vertical portion 20b of the fourth guide slot 20 of the frame 15. The guidance of the first pin 6 of the cassette holder 1 in the vertical portion 20b of the fourth guide slot 20 ensures that the cassette holder 1 and, as a result, the magnetic-tape cassette performs only a movement in the vertical loading direction 21 during the change-over from the intermediate position to the play position and the reel-disc openings 41 and 42 of the magnetic-tape cassette 2 are thus lowered onto the reel discs, not shown, of the magnetic-tape-cassette apparatus in the vertical loading direction 21. This guarantees a reliable engagement of the reel discs with the reel-disc openings 41 and 42 of the magnetic-tape cassette 2.

During the change from the intermediate position into the play position the lift element 8 performs a pure rotation about the first pin 9 and the second pin 10 of the lift element 8. The edge 27c of the second slot 27 of the first lift plate 25 then exerts a force in the vertical loading direction 21 on the third pin 11 of the lift element 8, as a result of which the third pin 11 of the lift element 8 slides down the inclined portion 27b of the second slot 27 of the first lift plate 25. The third pin 11 of the lift element 8 is then simultaneously guided in the curved vertical portion 19b of the third guide slot 19 of the frame 15. In the play position the reel-disc openings 41 and 42 of the magnetic-tape cassette 2 are in engagement with the reel discs, not shown, of the magnetic-tape-cassette apparatus and the magnetic tape of the magnetic-tape cassette can now be moved past a magnetic head, not shown, for example for operation in the play mode.

In order to move the magnetic-tape cassette 2 from the play position back into the eject position, the process described above proceeds in the reverse sequence. During the change from the play position into the intermediate position the first lift plate 25 is moved in a direction opposite to the horizontal loading direction 3, as a result of which the first lift element 8 is rotated about the first pin 9 and the second pin 10, respectively, from the play position into the intermediate position and as a result of which the cassette holder 1 is lifted from the play position into the intermediate position in a direction opposite to the vertical loading direction 21. During the change from the play position into the eject position the first lift plate 25 is moved in a direction opposite to the horizontal loading direction, driven by means of the toothed rack 30, which is pressed against the edge 25d of the first lift plate 25, the drive chain, not shown, and the servo motor, not shown. The first lift plate 25 then cooperates with the cassette holder 1 and the lift element 8 in such a manner that these parts together with the magnetic-tape cassette 2 are also moved from the intermediate position into the eject position in a direction opposite to the horizontal loading direction 3.

The forces to be applied by the servo motor by means of the drive chain, not shown, and the toothed rack 30 in order to drive the first lift plate 25 are particularly large during the movement from the play position into the intermediate position, because the magnetic-tape cassette 2 is to be lifted from the play position into the intermediate position against the force of gravity.

We claim:

1. A loading mechanism in a cassette apparatus for moving a cassette from an eject position of the loading mechanism into a play position of the loading mechanism, said loading mechanism comprising:

a cassette holder for holding the cassette;

a first lift plate;

the cassette holder being movable between an intermediate position of the loading mechanism and the play position of the loading mechanism while moving in a substantially vertical loading direction, the first lift plate and the cassette holder being movable from the eject position into the intermediate position in a horizontal loading direction;

a lift element arranged on a frame of said loading mechanism so as to be rotatable and so as to be movable in a horizontal loading direction;

the lift element further being rotatably coupled to the cassette holder in at least one coupling point;

wherein the cassette holder, the lift element and the first lift plate are movable from the intermediate position into the eject position and vice versa in the horizontal loading direction;

and wherein during the movement of the loading mechanism from the intermediate position into the play position and from the play position into the intermediate position the first lift plate is moved in the horizontal loading direction and exerts a force on the cassette holder and the lift element causing the cassette holder to be moved from the intermediate position into the play position and from the play position into the intermediate position substantially in the vertical loading direction while remaining perpendicular to the lift plate, during which movement of the lift plate, the lift element performs a rotational movement.

2. A loading mechanism as claimed in claim 1, wherein the lift element comprises a first and a second pin, which are respectively guided in a first and a second guide slot of the frame, which slots extend in the horizontal loading direction.

3. A loading mechanism as claimed in claim 2, wherein the lift element comprises a third pin, which is guided in a third guide slot of the frame, the third guide slot being substantially L-shaped and comprising a first horizontal portion, which extends in the horizontal loading direction, and a first vertical portion, which extends substantially in the vertical loading direction, the first vertical portion having a curved shape.

4. A loading mechanism as claimed in claim 3, wherein the cassette holder comprises a fourth pin, which is guided in a fourth guide slot in the frame, the fourth guide slot being substantially L-shaped and comprising a second horizontal portion, which extends in the horizontal loading direction, and a second vertical portion, which extends in the vertical loading direction.

5. A loading mechanism as claimed in claim 4, wherein the lift element comprises a fifth pin, which is guided in a fifth guide slot of the frame, the fifth guide slot being substantially L-shaped and comprising a third horizontal portion, which extends in the horizontal loading direction, and a third vertical portion, which extends substantially in the vertical loading direction, the vertical portion having a curved shape, and the cassette holder comprising a sixth pin, which is guided a sixth guide slot in the frame, the sixth guide slot being substantially L-shaped and comprising a fourth horizontal portion, which extends in the horizontal loading direction, and a fourth vertical portion, which extends in the vertical loading direction.

6. A loading mechanism as claimed in claim 5, wherein there is provided a second lift plate which is movable in the horizontal loading direction and which has a first and a second inclined slot, the second pin of the cassette holder engaging the first inclined slot of the second lift plate and the fourth pin of the lift element engaging the second inclined slot of the second lift plate.

7. A magnetic-tape-cassette apparatus including loading mechanism as claimed in claim 4.

8. A loading mechanism as claimed in claim 4 wherein the frame has a contact surface which extends in the horizontal loading direction and on which a projection of the cassette holder can be guided.

9. A loading mechanism as claimed in claim 2, wherein the frame has a contact surface which extends in the horizontal loading direction and on which a projection of the cassette holder can be guided.

10. A loading mechanism as claimed in claim 9, wherein a second slot of the first lift plate is curve-shaped, such that a tangent to this curved second slot forms a first angle with the vertical loading direction that increases in a direction towards an upper surface of the first lift plate.

11. A loading mechanism as claimed in claim 10, wherein the first slot of the first lift plate is curve-shaped, such that a tangent to this curved first slot forms a second angle with the vertical loading direction that increases in a direction towards the upper surface of the first lift plate.

12. A loading mechanism as claimed in claim 2, wherein the lift element and the first lift plate are restrained relative to one another by means of a spring.

13. A loading mechanism as claimed in claim 1, wherein the lift element and the first lift plate are restrained relative to one another by means of a spring.

14. A loading mechanism as claimed in claim 13, wherein the lift element is rotatably coupled to the cassette holder in at least two coupling points and said force is less than if said lift element was not present.

15. A loading mechanism as claimed in claim 1, wherein the lift element is rotatably coupled to the cassette holder in at least two coupling points.

16. A tape deck including a loading mechanism as claimed in claim 1.

17. A magnetic-tape-cassette apparatus including loading mechanism as claimed in claim 1.

18. A digital magnetic-tape-cassette apparatus including a loading mechanism as claimed in claim 1.

19. An apparatus for reading information which has been stored digitally on discs or other information carriers, including a loading mechanism as claimed in claim 1.

20. A loading mechanism, in a cassette apparatus for moving a cassette from an eject position of the loading mechanism into a play position of the loading mechanism, said loading mechanism comprising:

a cassette holder for holding the cassette;

a first lift plate;

the cassette holder being movable between an intermediate position of the loading mechanism and the play position of the loading mechanism while moving in a substantially vertical loading direction, the first lift plate and the cassette holder being movable from the eject position into the intermediate position in a horizontal loading direction;

a lift element arranged on a frame of said loading mechanism so as to be rotatable and so as to be movable in a horizontal loading direction, wherein the lift element comprises a first and a second pin, said first and second pins are respectively guided in a first and a second guide slot of the frame, which slots extend in the horizontal loading direction;

the lift element further comprises a third pin, which is guided in a third guide slot of the frame, the third guide slot being substantially L-shaped and comprising a first horizontal portion, which extends in the horizontal loading direction, and a first vertical portion, which extends substantially in the vertical loading direction, the first vertical portion having a curved shape;

the lift element further being rotatably coupled to the cassette holder in at least one coupling point;

the cassette holder comprises a fourth pin, which is guided in a fourth guide slot in the frame, the fourth guide slot being substantially L-shaped and comprising a second horizontal portion, which extends in the horizontal loading direction, and a second vertical portion, which extends in the vertical loading direction;

wherein the cassette holder, the lift element and the first lift plate are movable from the intermediate position into the eject position and vice versa in the horizontal loading direction; and wherein during the movement of the loading mechanism from the intermediate position into the play position and from the play position into the intermediate position the first lift plate is moved in the horizontal loading direction and exerts a force on the cassette holder and the lift element in such a manner that the cassette holder is moved from the intermediate position into the play position and from the play position into the intermediate position substantially in the vertical loading direction while remaining perpendicular to the lift plate, during which movement of the lift plate, the lift element performs a rotational movement; and wherein the first lift plate has a first and a second inclined slot, the fourth pin of the cassette holder engaging the first inclined slot and the third pin of the lift element engaging the second inclined slot.

\* \* \* \* \*